United States Patent
Hoang et al.

(10) Patent No.: US 7,111,208 B2
(45) Date of Patent: Sep. 19, 2006

(54) ON-CHIP STANDALONE SELF-TEST SYSTEM AND METHOD

(75) Inventors: Tuan M. Hoang, Westminster, CA (US); Hongtao Jiang, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 459 days.

(21) Appl. No.: 10/287,951

(22) Filed: Nov. 5, 2002

(65) Prior Publication Data

US 2004/0068683 A1 Apr. 8, 2004

Related U.S. Application Data

(60) Provisional application No. 60/415,490, filed on Oct. 2, 2002.

(51) Int. Cl.
*G01R 31/28* (2006.01)
*H04L 12/26* (2006.01)
*H04B 1/38* (2006.01)

(52) U.S. Cl. .................. 714/716; 370/249; 375/221

(58) Field of Classification Search ............ 714/25, 714/735, 733, 712, 713, 715, 716, 717, 724–739; 370/249, 242, 246, 903, 906; 375/221, 213
See application file for complete search history.

(56) References Cited

U.S. PATENT DOCUMENTS

| | | | | |
|---|---|---|---|---|
| 3,916,379 A | * | 10/1975 | Dulaney et al. | ............ 714/704 |
| 5,477,531 A | * | 12/1995 | McKee et al. | ............... 370/249 |
| 5,956,370 A | * | 9/1999 | Ducaroir et al. | ............ 375/221 |
| 5,995,811 A | | 11/1999 | Watanabe | |
| 6,009,104 A | * | 12/1999 | Kalkunte | .................... 370/448 |
| 6,028,845 A | * | 2/2000 | Serikawa et al. | ........... 370/249 |
| 6,052,362 A | * | 4/2000 | Somer | ........................ 370/246 |
| 6,069,876 A | | 5/2000 | Lander et al. | |
| 6,201,829 B1 | * | 3/2001 | Schneider | .................... 375/221 |
| 6,208,621 B1 | | 3/2001 | Ducaroir et al. | |
| 6,226,290 B1 | * | 5/2001 | Salett et al. | ................ 370/389 |
| 6,340,899 B1 | | 1/2002 | Green | |
| 6,385,236 B1 | * | 5/2002 | Chen | ........................ 375/224 |

(Continued)

FOREIGN PATENT DOCUMENTS

JP 410013465 A * 1/1998

OTHER PUBLICATIONS

Hunter et al., "WASPNET: A Wavelength Switched Packet Network", IEEE Communications Magazine, vol. 37, Issue 3, Mar. 1999, pp. 120-129.*

(Continued)

*Primary Examiner*—Guy Lamarre
*Assistant Examiner*—John P. Trimmings
(74) *Attorney, Agent, or Firm*—McAndrews, Held & Malloy

(57) ABSTRACT

A method and system are disclosed for providing standalone built-in self-testing of a transceiver chip. The transceiver chip includes packet generators for generating test packets and packet checkers for comparing received packets with expected packets. The transceiver chip may be configured for testing through at least two wraparound test paths—a first test path that includes an elastic FIFO of a transmit path of the transceiver chip, and a second test path that includes an elastic FIFO of a receive path of the transceiver chip. During testing, the test packets are generated by packet generators within the transceiver chip and routed through the at least two wraparound test paths to packet checkers within the same transceiver chip. The packet checkers compare the returned packets to the expected packets. If the returned packets are inconsistent with the expected packets, the transceiver chip is defective.

49 Claims, 8 Drawing Sheets

U.S. PATENT DOCUMENTS

| | | | |
|---|---|---|---|
| 6,385,738 B1 * | 5/2002 | Lo | 714/25 |
| 6,389,092 B1 | 5/2002 | Momtaz | |
| 6,424,194 B1 | 7/2002 | Hairapetian | |
| 6,693,881 B1 * | 2/2004 | Huysmans et al. | 370/236.1 |
| 6,775,240 B1 * | 8/2004 | Zhang et al. | 370/251 |
| 6,954,425 B1 * | 10/2005 | Chen et al. | 370/229 |
| 2001/0016929 A1 * | 8/2001 | Bonneau et al. | 714/735 |
| 2001/0043648 A1 | 11/2001 | Ducaroir et al. | |
| 2002/0018535 A1 | 2/2002 | Hairapetian et al. | |
| 2002/0053056 A1 | 5/2002 | Kuegler et al. | |
| 2003/0035473 A1 * | 2/2003 | Takinosawa | 375/224 |
| 2003/0043752 A1 * | 3/2003 | Totsuka et al. | 370/249 |
| 2003/0149921 A1 * | 8/2003 | Lau et al. | 714/704 |
| 2003/0179777 A1 * | 9/2003 | Denton et al. | 370/503 |

OTHER PUBLICATIONS

Chown et al., "Integrated Transceiver for FDDI", IEEE Electronics Components Conference, May 1989, pp. 378-383.*

Wu et al., "Design and Verification of Differential Transmission Lines", IEEE Electrical Performance of Electronic Packaging, Oct. 29-31, 2001, pp. 85-88.*

* cited by examiner

US 7,111,208 B2

ON-CHIP STANDALONE SELF-TEST SYSTEM AND METHOD

CROSS-REFERENCE TO RELATED APPLICATIONS/INCORPORATION BY REFERENCE

U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, U.S. application Ser. No. 60/401,872 entitled "SYSTEM AND METHOD FOR PERFORMING ON-CHIP SELF TESTING" filed on Aug. 7, 2002, and U.S. application Ser. No. 60/402,097 entitled "SYSTEM AND METHOD FOR IMPLEMENTING A SINGLE CHIP HAVING A MULTIPLE SUB-LAYER PHY" filed on Aug. 7, 2002, are each incorporated herein by reference in their entirety.

This application also makes reference to, claims priority to and claims the benefit of U.S. Provisional Patent Application Ser. No. 60/415,490 filed on Oct. 2, 2002.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Certain embodiments of the present invention relate generally to testing optical networking hardware, and more particularly to a system and method for performing standalone self-testing.

High-speed digital communication networks over copper and optical fiber are used in many network communication and digital storage applications. Ethernet and Fiber Channel are two widely used communication protocols used today and continue to evolve to respond to the increasing need for higher bandwidth in digital communication systems.

The Open Systems Interconnection (OSI) model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it.

Layers 1 to 4 handle network control and data transmission and reception. Layers 5 to 7 handle application issues. Specific functions of each layer may vary to a certain extent, depending on the exact requirements of a given protocol to be implemented for the layer. For example, the Ethernet protocol provides collision detection and carrier sensing in the data link layer.

The physical layer, Layer 1, is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement this layer.

As data rate and bandwidth requirements increase, 10 Gigabit data transmission rates are being developed and implemented in high-speed networks. Pressure exists to develop a 10 Gigabit physical layer for high-speed serial data applications. Transceivers for 10 G applications are needed for the 10 G physical layer. The specification IEEE P802.3ae draft 5 describes the physical layer requirements for 10 Gigabit applications and is incorporated herein by reference in its entirety.

An optical-based transceiver, for example, includes various functional components such as clock data recovery, clock multiplication, serialization/de-serialization, encoding/decoding, electrical/optical conversion, descrambling, media access control, controlling, and data storage. Many of the functional components are often implemented each in a separate IC chip.

Testing of IC chips often involves applying inputs and capturing outputs by an external source. The external source then compares the captured outputs against expected outputs that are known to be accurate. Defective IC chips are detected when the captured outputs are inconsistent with the expected outputs.

Testing an IC chip by application of inputs and capturing of outputs by an external source becomes difficult as the data rate of the IC chip increases. The external source must apply the inputs and capture the outputs at the data rate of the IC chip. As stated above, IC chips in optical transceivers may be required to operate with data at rates of 10 Gbps.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention provide a method and system for standalone self testing of a single transceiver chip having a multiple sub-layer PHY.

A system and method of the present invention provides for standalone built-in self-testing of a transceiver chip. The transceiver chip includes packet generators for providing test packets and packet checkers for comparing received packets with expected packets. The transceiver chip may be configured for testing through at least two wraparound test paths—a first wraparound test path that includes an elastic FIFO of a transmit path of the transceiver chip, and a second wraparound test path that includes an elastic FIFO of a receive path of the transceiver chip. During testing, the test packets are generated by packet generators within the transceiver chip and routed through the at least two wraparound test paths to packet checkers within the same transceiver chip. The packet checkers compare the returned packets to the expected packets. If the returned packets are inconsistent with the expected packets, the transceiver chip is defective. A separate external source to generate and check packets is not used.

These and other advantages, aspects and novel features of the present invention, as well as details of an illustrated embodiment thereof, will be more fully understood from the following description and drawings.

DETAILED DESCRIPTION OF THE INVENTION

Figure 1:
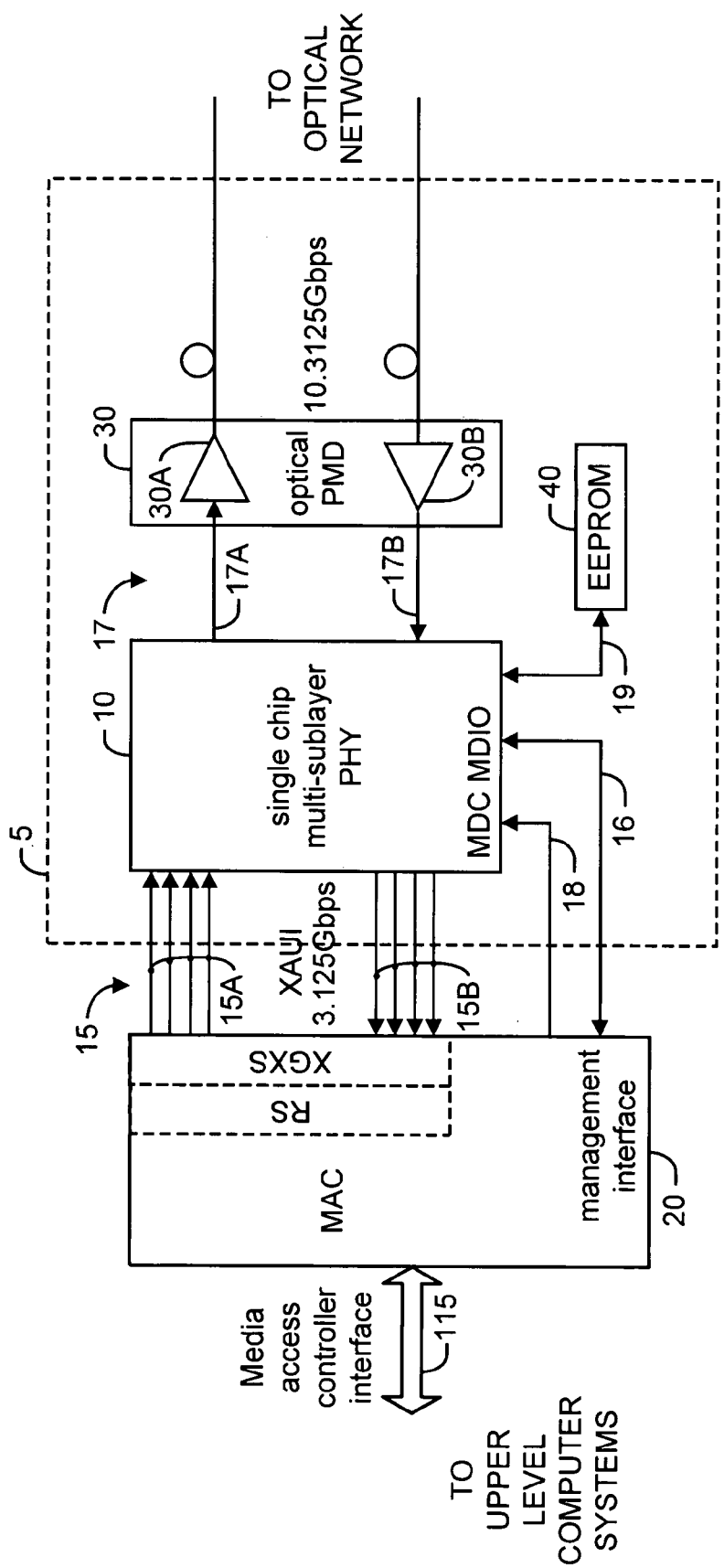
FIG. 1 is a block diagram of an exemplary transceiver module having a single chip multi-sublayer PHY in accordance with an embodiment of the present invention.

FIG. 1 is a schematic block diagram illustrating certain components of a 10 Gigabit transceiver module 5 with a XAUI (10 Gigabit attachment unit interface) 15 in accordance with an embodiment of the present invention. The transceiver module 5 may, in one embodiment of the present invention, be compatible with the XENPAK (XAUI module specification) optical module standard. The transceiver module 5 may, in another embodiment of the present invention, be compatible with the XPAK (second generation to XENPAK specification) optical module standard. The transceiver module 5 includes, for example, a single-chip multi-sublayer PHY (physical layer) 10 also known herein as the transceiver chip 10, an optical PMD (physical media dependent) 30, and an EEPROM 40.

According to an embodiment of the present invention, a media access controller (MAC) 20 interfaces to the single-chip multi-sublayer PHY 10 through the XAUI transmit and receive interface 15. In general, the MAC layer is one of two sublayers of the data link control layer and is concerned with sharing the physical connection to a network among several upper-level systems (e.g. computer systems). The single-chip multi-sublayer PHY 10 interfaces to the optical PMD 30 through a PMD transmit and receive interface 17. The MAC 20 also interfaces to the single-chip multi-sublayer PHY 10 through the serial MDIO (management data input/output) interface 16. The single-chip multi-sublayer PHY 10 also interfaces to EEPROM 40 through a two-wire serial interface 19. A separate XGMII (10 Gigabit media independent interface) is not needed.

The XAUI interface 15 includes 4 channels of 3 Gigabit serial data received by the single-chip multi-sublayer PHY 10 from the MAC 20 and 4 channels of 3 Gigabit serial data transmitted from the single-chip multi-sublayer PHY 10 to the MAC 20. In an embodiment of the present invention, the MAC includes a XGXS (Gigabit media independent interface extender) sublayer interface and a reconciliation sublayer (RS) interface. In one embodiment of the present invention, for Ethernet operation, the 3 Gigabit data rate is actually 3.125 Gbps and for Fibre Channel operation, the 3 Gigabit data rate is actually 3.1875 Gbps.

The PMD interface 17 includes a 10 Gigabit serial transmit differential interface 17A and a 10 Gigabit serial receive differential interface 17B between the single-chip multi-sublayer PHY 10 and the optical PMD 30 in accordance with an embodiment of the present invention. In one embodiment of the present invention, for Ethernet operation, the 10 Gigabit data rate is actually 10.3125 Gbps and for Fibre Channel operation, the 10 Gigabit data rate is actually 10.5188 Gbps.

Figure 2:
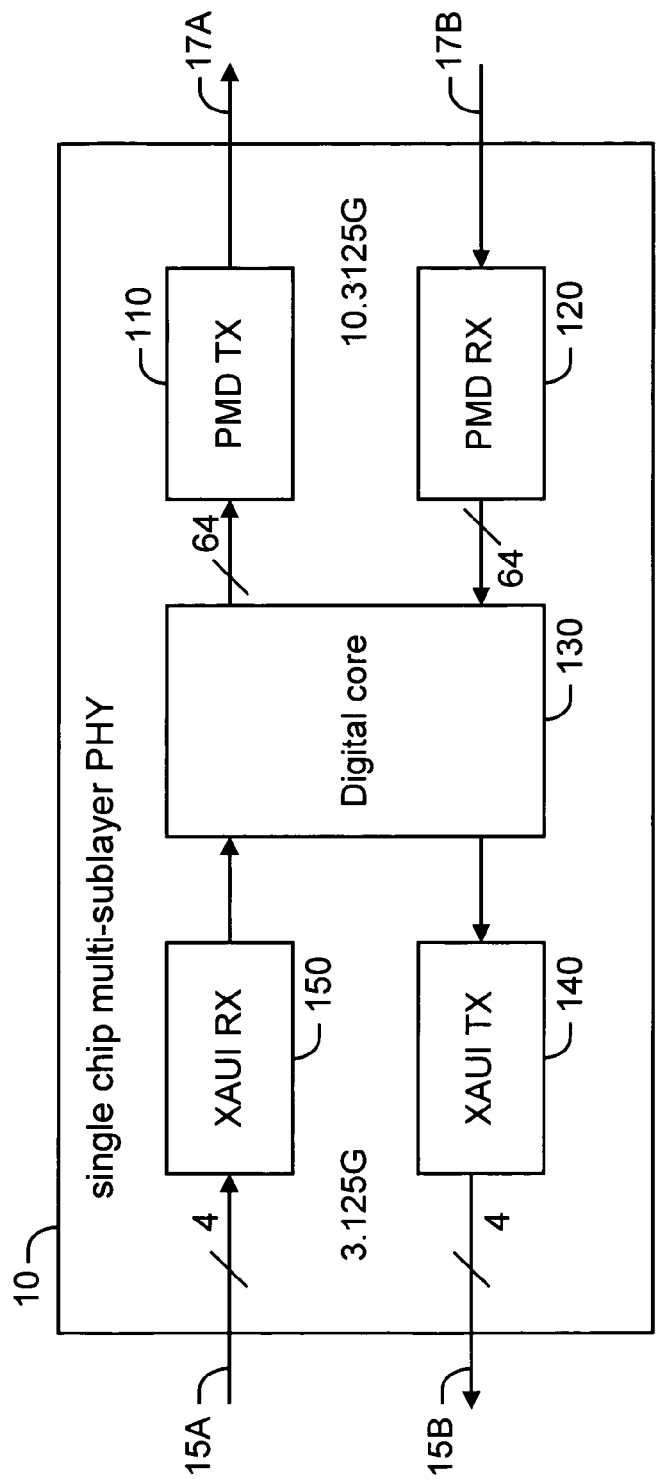
FIG. 2 is a block diagram of an exemplary single-chip multi-sublayer PHY used in the transceiver module of FIG. 1 in accordance with an embodiment of the present invention.

FIG. 2 is a schematic block diagram of the single-chip multi-sublayer PHY 10 used in the transceiver module 5 of FIG. 1 in accordance with an embodiment of the present invention. The single-chip multi-sublayer PHY 10 includes a PMD transmit (TX) section 110, a PMD receive (RX) section 120, a digital core section 130, a XAUI transmit (TX) section 140, and a XAUI receive (RX) section 150.

Figure 3:
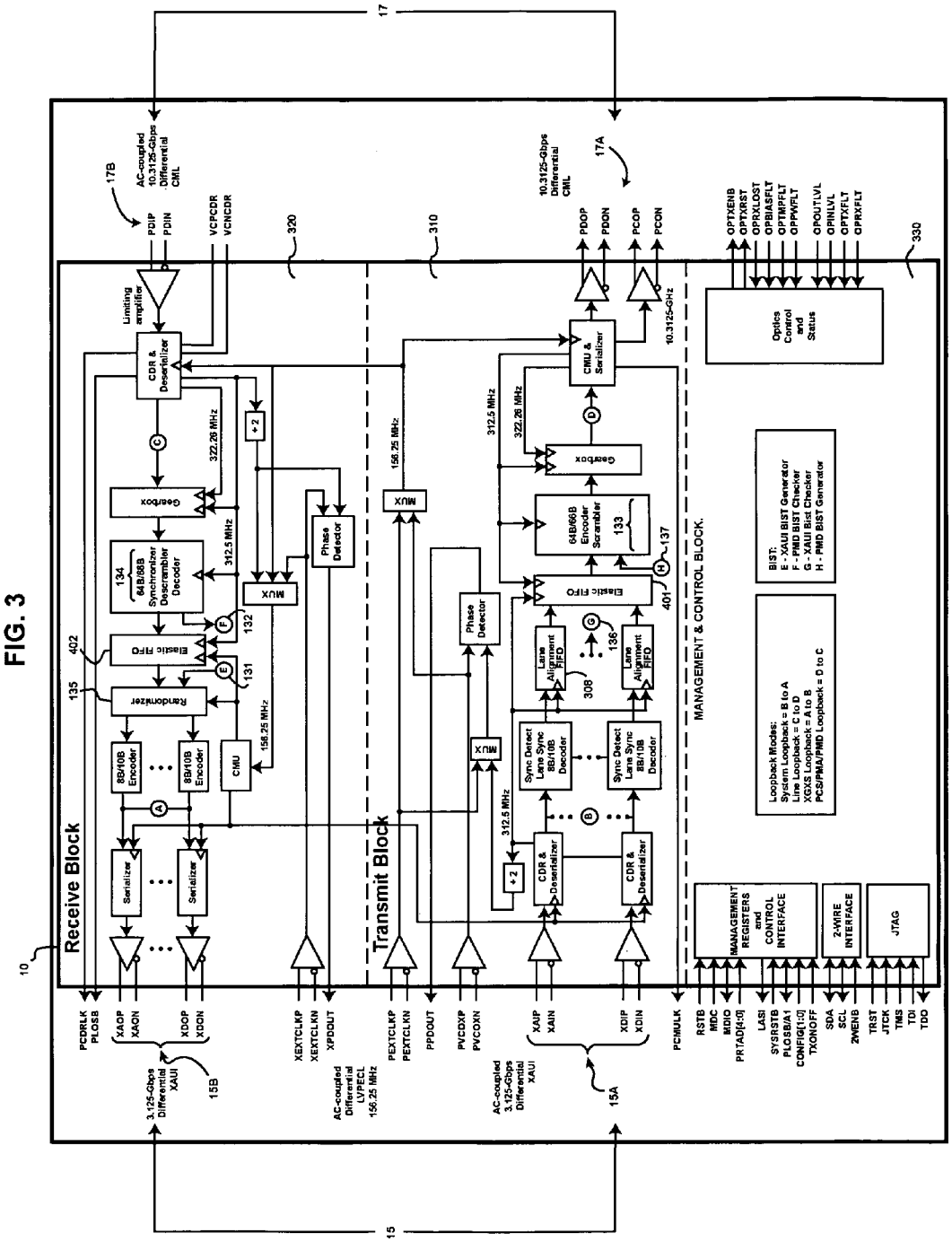
FIG. 3 is a more detailed block diagram of the single-chip multi-sublayer PHY of FIG. 2 in accordance with an embodiment of the present invention.

FIG. 3 is a more detailed schematic block diagram of the single-chip multi-sublayer PHY 10 of FIG. 2 used in the transceiver module 5 of FIG. 1 in accordance with an embodiment of the present invention. The single-chip multi-sublayer PHY 10 comprises three main functional paths including a transmit path 310, a receive path 320, and a management and control path 330. The single-chip multi-sublayer PHY 10 supports asynchronous clocking mode operation of the XAUI and PMD interfaces. Clock interfaces are provided for configuring the XAUI and PMD interfaces to asynchronous or independent asynchronous operations in accordance with an embodiment of the present invention. The local reference clock or external transmit VCXO may adhere to the IEEE specifications.

In the asynchronous mode, elastic FIFOs are used that accommodate a frequency difference of up to 200 ppm between a recovered clock and a local reference clock. Both the RX and TX data paths 310 and 320 contain an elastic FIFO. Idle columns of four bytes are inserted or deleted during the inter packet gap (IPG) once the distance between the elastic FIFO's read and write pointers exceed a threshold. In addition, a column of sequence orders may be deleted during the IPG once the distance between the elastic FIFO's read and write pointer exceed a threshold. The delete adjustments occur on IPG streams that contain at least two columns of idles or sequence order sets.

Therefore, the Elastic FIFO is enabled to accommodate frequency differences between the XAUI CDR (clock data recovery) clock and the PMD CMU (clock multiplier unit) clock (external reference clock), and differences between the PMD CDR (clock data recovery) clock and the XAUI CMU clock (external reference clock).

The data transmitted/received is formatted in accordance with a known protocol, such as the open systems interconnection (OSI) model (ISO standard). The ISO standard places data into packets including seven distinct and hierarchical functional layers, known as headers, followed by the data. The functional layers include a data link layer and a physical layer. The data link layer and the physical layer are considered the two lowest level layers of the seven functional layers. The upper level computer systems build the five highest functional layers for data packets which are to be transmitted over the optical network.

The data link layer is associated with the media access controller (MAC) 20 which is interfaced to the upper level computer system by a MAC interface 115. The standard MAC data rate for 10 Gigabit operation is about 10 Gbps. The physical layer for each packet is built by the transceiver module 5.

Data packets received by the transceiver module 5 include each of the seven functional layers. The transceiver module 5 examines the physical layer of data packets and uses the data in the physical layer to decode the data packets. The MAC 20 examines the data link layer of data packets and uses the data in the data link layer to decode the data packets.

The MAC 20 and the single chip multi-sublayer PHY 10 transmit data therebetween using an interface known as the 10 Gbps Ethernet Attachment Unit Interface (XAUI) 15. The XAUI is a low pin count, self-clocked bus directly evolved from lower data rate protocols and is used for 10 G operation. The XAUI is arranged as two, 4-channel interfaces, each with four serial lines, thereby achieving about 10 Gbps throughput. One XAUI interface 15A transmits data from the MAC 20 to the single-chip multi-sublayer PHY 10, while the other XAUI interface 15B transmits data from the single-chip multi-sublayer PHY 10 to the MAC 20.

The single chip multi-sublayer PHY 10 (transceiver chip) is a fully integrated serialization/deserialization interface device. The single chip multi-sublayer PHY 10 serializes the data received over the 4-channel XAUI interface 15A and transmits the data as a single 10 Gbps stream to the optical PMD 30. The single chip multi-sublayer PHY 10 also deserializes a single 10 Gbps signal from the optical PMD 30 and transmits the data as, for example, 4-channels×3.125 Gbps over XAUI interface 15B.

Data is received from and transmitted to the optical network via the optical PMD 30. The optical PMD 30 includes an optical transmitter 30A and an optical receiver 30B. The optical transmitter 30A transmits data from the computer system over the optical network. The optical receiver 30B receives data from the optical network and transmits the data to the computer system. The optical PMD 30 also acts as an electrical/optical interface. Electrical signals are received at optical transmitter 30A and transmitted as optical signals over the optical networks while the optical signals are received at optical receiver 30B and transmitted as electrical signals to the computer system.

The single-chip multi-sublayer PHY 10 supports standalone built in self-testing through two different wraparound test paths in accordance with an embodiment of the present invention. A first wraparound test path includes an elastic FIFO 401 of a transmit path 310 of the transceiver chip 10, and a second wraparound test path includes an elastic FIFO 402 of a receive path 320 of the transceiver chip 10. Test packets are wrapped around through a test fixture that connects the inputs and outputs of the XAUI interface 15 of the transceiver chip 10 and the inputs and outputs of the PMD interface 17 of the transceiver chip 10. In accordance with an embodiment of the present invention, the test fixture is a simple circuit board that allows power to be supplied to the transceiver chip 10 and electrically loops back the test packets over the XAUI interface 15 and the PMD interface 17. In other embodiments of the present invention, the test fixture may be more complex and include, for example, an optical loopback circuit for the PMD interface 17.

Figure 4:
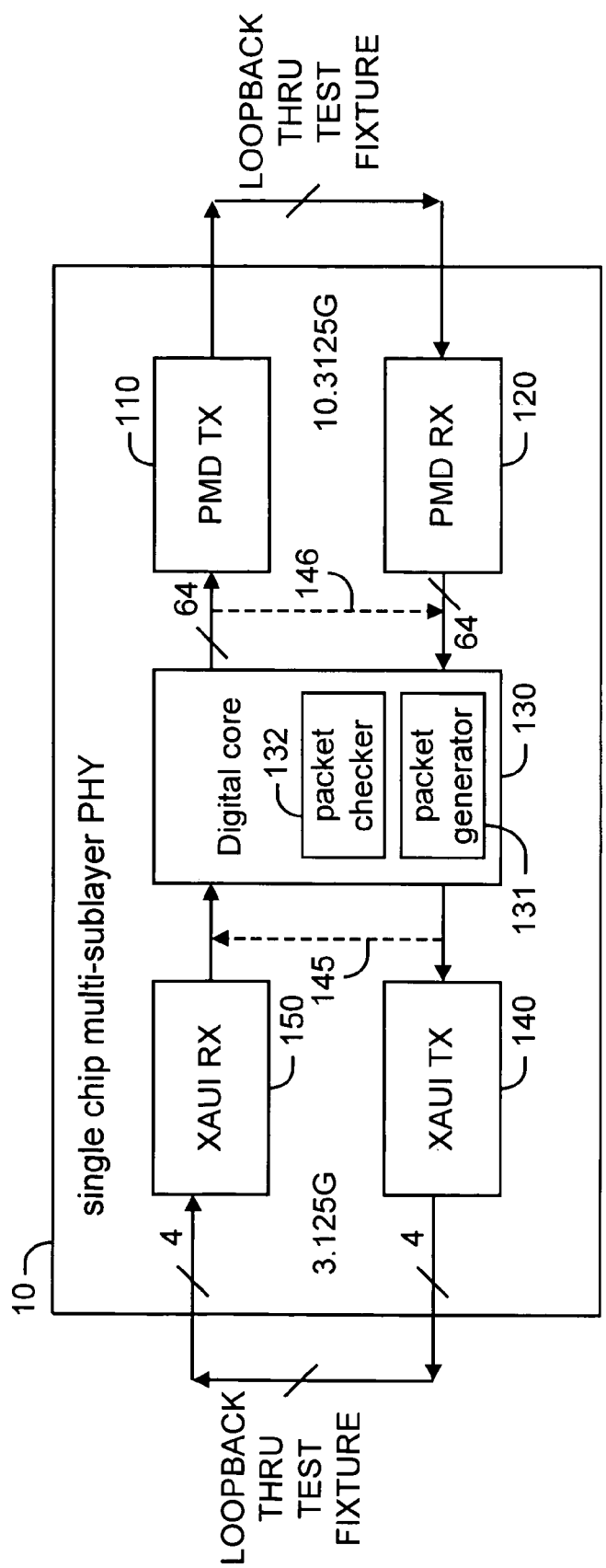
FIG. 4 is a block diagram of an exemplary configuration for standalone self-testing of the single-chip multi-sublayer PHY of FIG. 2 through a first wraparound test path in accordance with an embodiment of the present invention.

Referring to FIG. 4, for the first wraparound test path, the digital core 130 includes a packet generator 131 and a packet checker 132. The packet generator 131 and the packet checker 132 allow standalone built-in self testing of the single-chip multi-sublayer PHY 10 in accordance with an embodiment of the present invention (also see FIG. 3).

Figure 5:
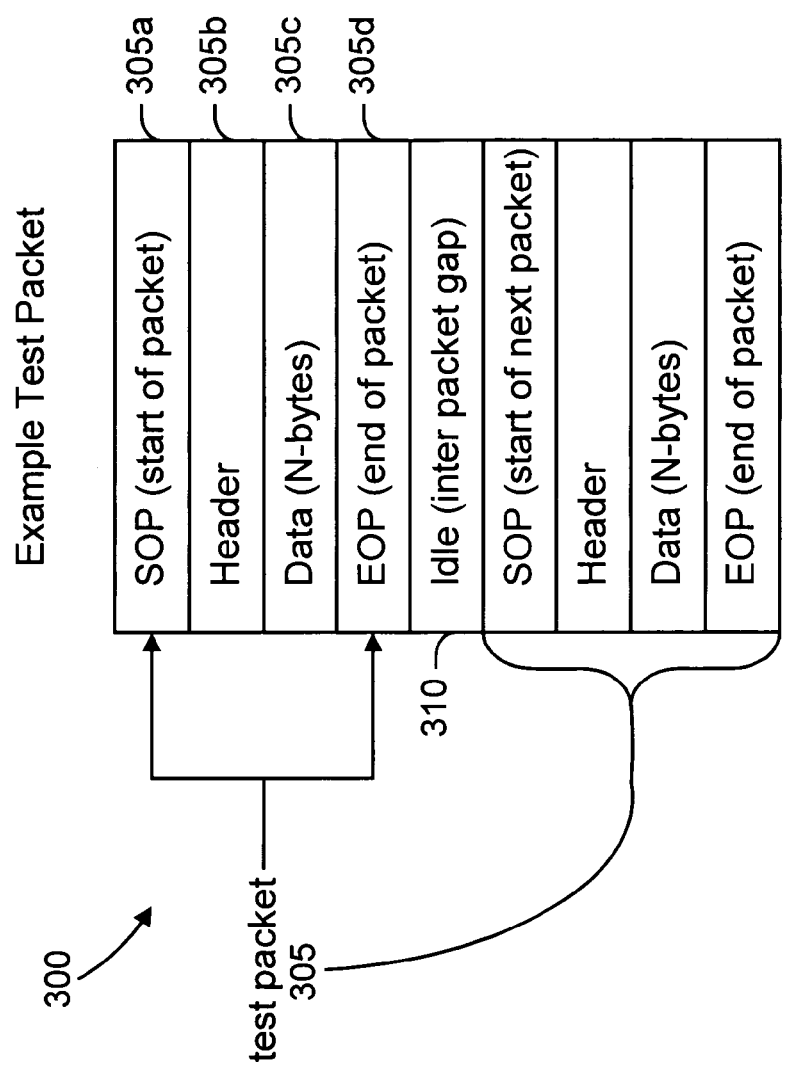
FIG. 5 is an illustration of an exemplary test packet stream generated by the single-chip multi-sublayer PHY of FIG. 2 in accordance with an embodiment of the present invention.

Referring now to FIG. 5, there is illustrated a block diagram describing an exemplary test packet stream 300 which may be generated by the packet generator 131, in accordance with one embodiment of the present invention. The test packet stream 300 includes any number of test packets 305 and interpacket gaps (IPG) 310 inserted between the test packets 305. The test packets 305 include a start of packet sequence 305a, followed by a header 305b, a data portion 305c, and an end of packet sequence 305d. The data portion 305c may comprise sequential data or pseudo-random data.

To test frequency offset under stress conditions, the IPG size may be sequentially varied during testing from 4 idle bytes to 8 idle bytes to 12 idle bytes to 16 idle bytes to 20 idle bytes and back to 4 idle bytes (repeating) for an average minimum IPG of 12 idle bytes as specified in IEEE 802.3ae.

Figure 6:
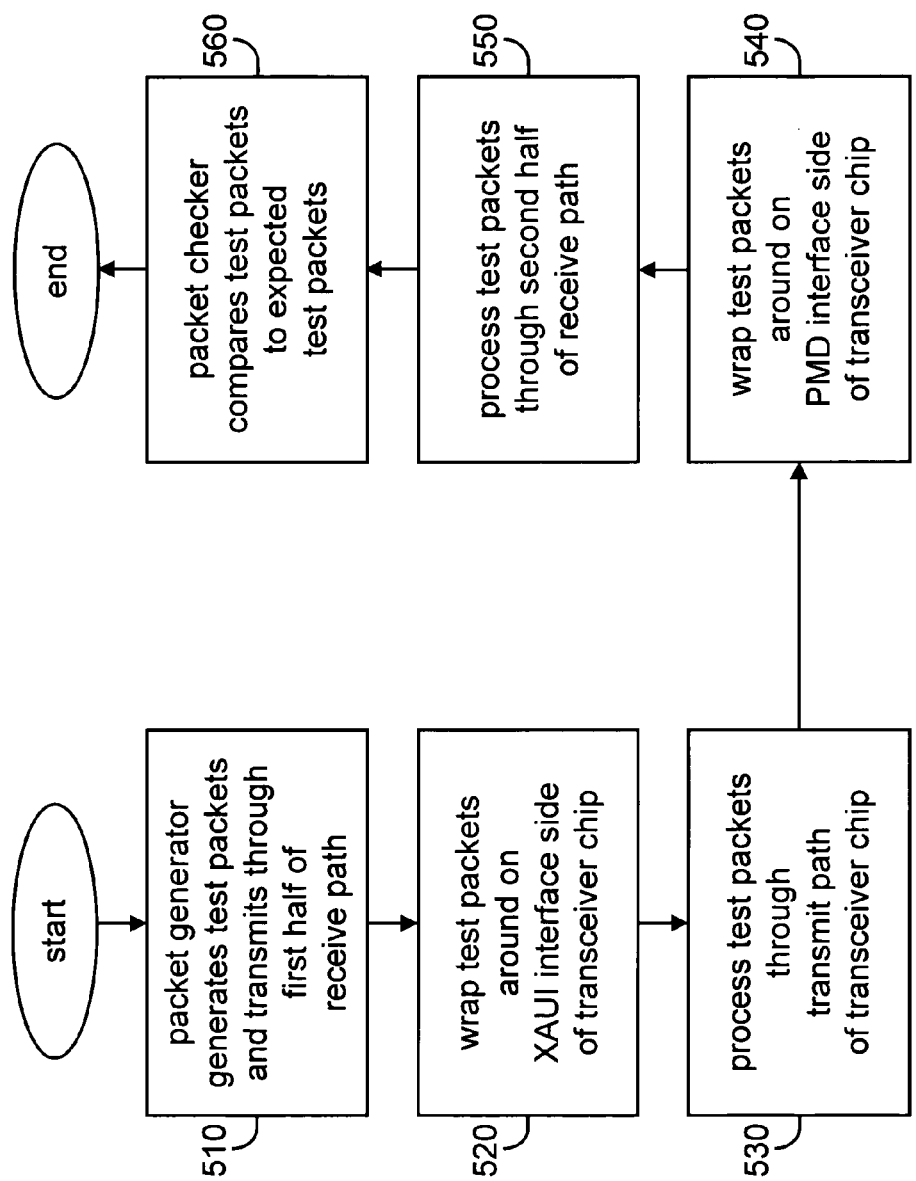
FIG. 6 is a flow diagram describing standalone self-testing of the single-chip multi-sublayer PHY of FIG. 2 through a first wraparound test path in accordance with an embodiment of the present invention.

Referring to the flow diagram of FIG. 6 and to FIG. 1 and FIG. 3, in step 510, the packet generator 131 generates test packets that are transmitted through a first half of the receive path 320 from point E to point A to the XAUI output interface 15B. In step 520, the test packets are electrically wrapped around on the XAUI interface side 15 of the transceiver chip 10 into the transmit path 310 of the transceiver chip 10. In step 530, the test packets go through the transmit path 310 from point B to point G through the elastic FIFO 401 to point D and to the PMD output interface 17A. In step 540, the test packets are electrically wrapped around on the PMD interface side 17 of the transceiver chip 10 from the transmit path 310 to the receive path 320. In step 550, the test packets go through the second half of the receive path 320 through point C and then are received at the packet checker 132 at point F. The packet checker 132 maintains a copy of the test packets, known as the expected packets. Finally, in step 560, the packet checker 132 compares the test packets received, from the wrapping around process, to the expected packets. The transceiver chip 10 is defective if the received test packets are inconsistent with the expected packets. For the first wraparound test path, the only part of the chip not tested is the elastic FIFO 402 in the receive path 320.

Referring again to FIG. 3, there is illustrated an exemplary single-chip multi-sublayer PHY 10, in accordance with one embodiment of the present invention. The packet generator 131 for testing of the first wraparound test path may be incorporated onto receive path 320 at randomizer 135 (point E) while the packet checker 132 for testing of the first wraparound test path may be incorporated onto receive path 320 at 64B/66B Synchronizer Descrambler Decoder 134 (point F).

As an alternative, packet checker 136 may be used as well during testing of the first wrap around test path to allow further isolation of any defective region of the chip.

As a further alternative, the XAUI and/or PMD TX and RX sections (110, 120, 140, and 150) may be bypassed. Instead of looping around the external interfaces through a test fixture, looping may be done internally around the digital core along internal paths 145 and 146 around digital core 130 as shown in FIG. 4. Such internal looping back may provide further fault isolation.

Figure 7:
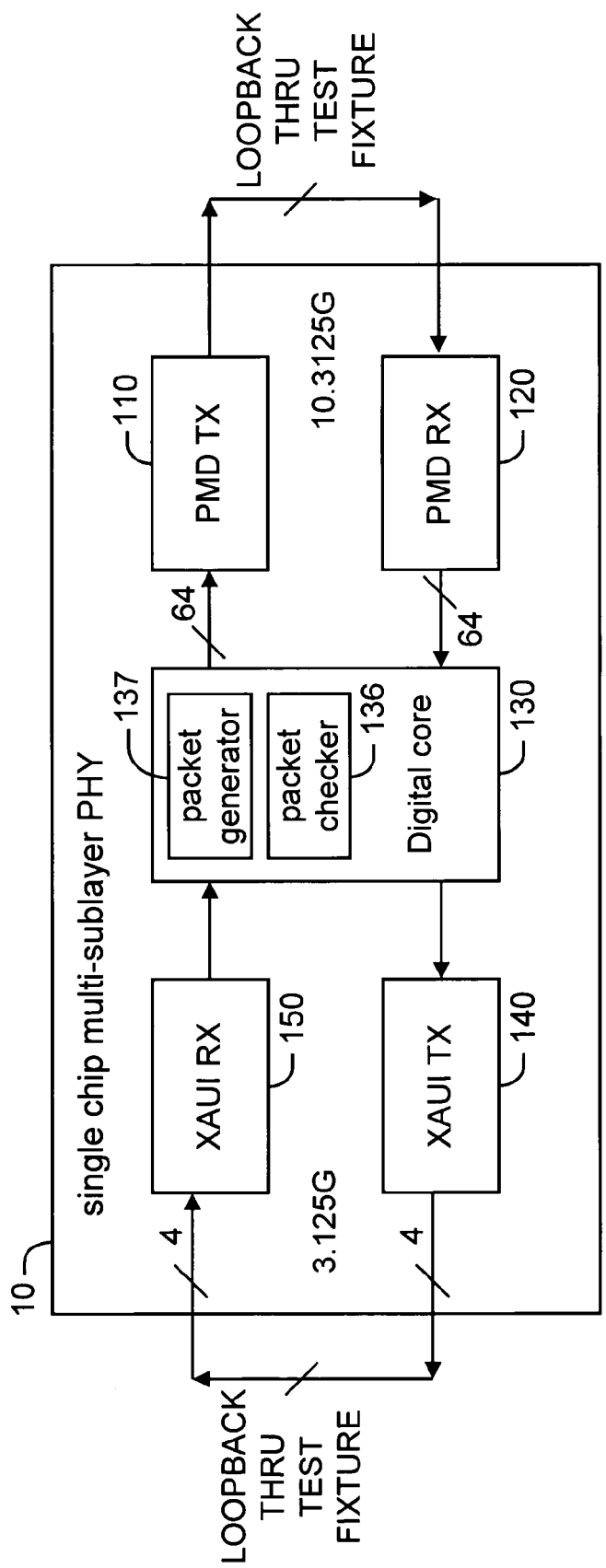
FIG. 7 is a block diagram of an exemplary configuration for standalone self-testing of the single-chip multi-sublayer PHY of FIG. 2 through a second wraparound test path in accordance with an embodiment of the present invention.

Referring to FIG. 7, for the second wraparound test path, the digital core 130 includes a packet generator 137 and a packet checker 136. The packet generator 137 and the packet checker 136 allow standalone built-in self testing of the single-chip multi-sublayer PHY 10 in accordance with an embodiment of the present invention (also see FIG. 3).

Figure 8:
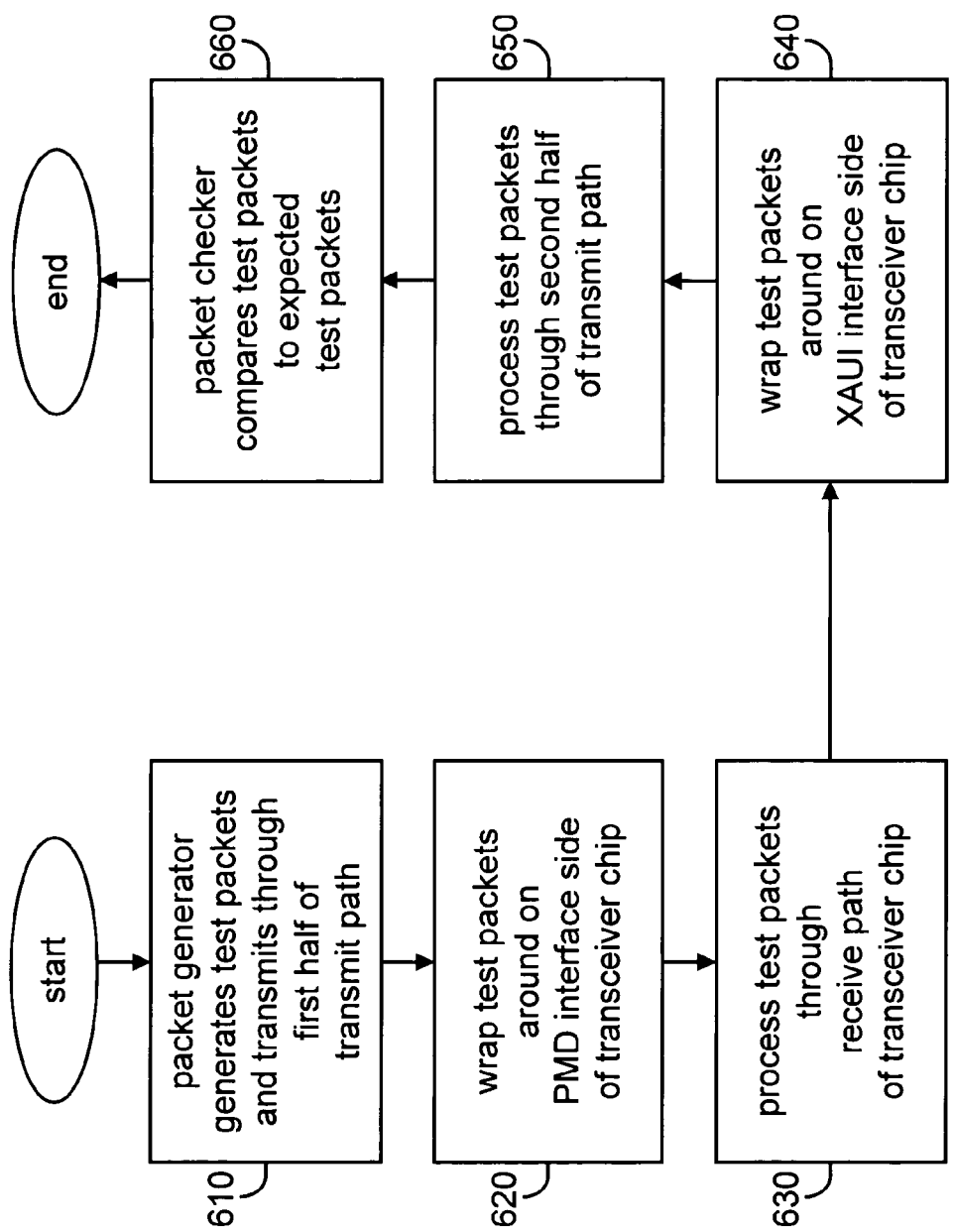
FIG. 8 is a flow diagram describing standalone self-testing of the single-chip multi-sublayer PHY of FIG. 2 through a second wraparound test path in accordance with an embodiment of the present invention.

Referring to the flow diagram of FIG. 8 and to FIG. 3, in step 610, the packet generator 137 generates test packets that are transmitted through a first half of the transmit path 310 from point H to point D to the PMD output interface 17A. In step 620, the test packets are electrically wrapped around on the PMD interface side 17 of the transceiver chip 10 into the receive path 320 of the transceiver chip 10. In step 630, the test packets go through the receive path 320 through point C, through the elastic FIFO 402 to point A, and to XAUI output interface 15B. In step 640, the test packets are electrically wrapped around on the XAUI interface side 15 of the transceiver chip 10 from the receive path 320 to the transmit path 310. In step 650, the test packets go through the second half of the transmit path 310 to point B and to point G and may then be received at the packet checker 136. The packet checker 136 maintains a copy of the test packets, known as the expected packets. In step 660, the packet checker 136 compares the test packets received, in the wrap around process, to the expected packets. The transceiver chip 10 is defective if the received test packets are inconsistent with the expected packets. For the second wraparound test path, the only part of the chip not tested is the elastic FIFO 401 in the transmit path 310.

Referring again to FIG. 3, the packet generator 137, for testing the second wraparound test path, may be incorporated onto transmit path 310 at 64B/66B Encoder Scrambler 133 (point H) while the packet checker 136 for testing the second wraparound test path may be incorporated onto transmit path 310 at lane alignment FIFO 308 (point G).

As an alternative, packet checker 132 may be used as well during testing of the second wrap around test path to allow further isolation of any defective region of the chip.

Again, as a further alternative, the XAUI and/or PMD TX and RX sections (110, 120, 140, and 150) may be bypassed. Instead of looping around the external interfaces through a test fixture, looping may be done internally around the digital core along internal paths 145 and 146 around digital core 130 as shown in FIG. 4. Such internal looping back may provide further fault isolation.

By testing both the first and second wraparound test paths, the entire transceiver chip 10 is self-tested. In fact, the vast majority of the transceiver chip 10 is effectively tested twice.

As an alternative, the packet generators and packet checkers may be located at various other places within the transceiver chip 10. As a further alternative, the PMD interface side 17 may be wrapped around through an optical loop such as through an optical PMD, instead of being looped back electrically.

In summary, certain embodiments of the present invention provide a system and method for standalone built-in self-testing of a transceiver chip. The transceiver chip includes packet generators for providing test packets and packet checkers for comparing received packets with expected packets. The transceiver chip may be configured for testing through two wraparound test paths—a first wraparound test path that includes an elastic FIFO of a transmit path of the transceiver chip, and a second wraparound test path that includes an elastic FIFO of a receive path of the transceiver chip.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for standalone self-testing of a transceiver chip, said method comprising:
    generating a packet stream within said transceiver chip, wherein said packet stream comprises a plurality of test packets that are separated by interpacket gaps of variable length;
    processing at least one test packet through said transceiver chip by at least looping back through a first interface of said transceiver chip and looping back through a second interface of said transceiver chip; and
    comparing, within said transceiver chip, said processed at least one test packet to at least one expected test packet to test frequency offset.

2. The method of claim 1 wherein said first interface comprises a parallel XAUI interface.

3. The method of claim 1 wherein said second interface comprises a 10 Gbps serial PMD interface.

4. The method of claim 1 wherein said processing includes processing said at least one test packet through a first section of a receive path of said transceiver chip immediately after generating said at least one test packet.

5. The method of claim 1 wherein said looping back through said first interface comprises wrapping around said at least one test packet from a receive path of said transceiver chip to a transmit path of said transceiver chip.

6. The method of claim 1 wherein said processing includes processing said at least one test packet through an entire transmit path of said transceiver chip, wherein said transmit path includes an elastic FIFO.

7. The method of claim 1 wherein said looping back through said second interface comprises wrapping around said at least one test packet from a transmit path of said transceiver chip to a receive path of said transceiver chip.

8. The method of claim 1 wherein said processing includes processing said at least one test packet through a second section of a receive path of said transceiver chip immediately after looping back through said second interface.

9. The method of claim 1 wherein said processing includes processing said at least one test packet through a first section of a transmit path of said transceiver chip immediately after generating said at least one test packet.

10. The method of claim 1 wherein said processing includes processing said at least one test packet through an entire receive path of said transceiver chip, wherein said receive path includes an elastic FIFO.

11. The method of claim 1 wherein said processing includes processing said at least one test packet through a second section of a transmit path of said transceiver chip immediately after looping back through said first interface.

12. The method of claim 1 wherein said transceiver chip comprises a single-chip multiple-sublayer PHY.

13. The method of claim 1, wherein the length of the interpacket gaps is sequentially varied.

14. The method of claim 13, wherein the sequential variance is used to test frequency offset.

15. The method of claim 13, wherein the length of consecutive interpacket gaps varies by 4 bytes.

16. The method of claim 13, wherein the average length of the interpacket gaps is at least 12 bytes.

17. Apparatus for standalone self-testing of a transceiver chip, said apparatus comprising:
a packet generator within said transceiver chip to generate a packet stream within said transceiver chip, wherein said packet stream comprises a plurality of test packets that are separated by interpacket gaps of variable length;
a test fixture for looping back at least one test packet through a first interface of said transceiver chip and a second interface of said transceiver chip; and
a packet checker within said transceiver chip to compare said looped back at least one test packet to at least one expected test packet to test frequency offset.

18. The apparatus of claim 17 wherein said packet generator resides in a transmit path of said transceiver chip.

19. The apparatus of claim 17 wherein said packet generator resides in a receive path of said transceiver chip.

20. The apparatus of claim 17 wherein said packet checker resides in a transmit path of said transceiver chip.

21. The apparatus of claim 17 wherein said packet checker resides in a receive path of said transceiver chip.

22. The apparatus of claim 17 wherein said first interface comprises a parallel XAUI interface.

23. The apparatus of claim 17 wherein said second interface comprises a 10 Gbps serial PMD interface.

24. The apparatus of claim 17 wherein said test fixture loops back said at least one test packet through said first interface from a receive path of said transceiver chip to a transmit path of said transceiver chip.

25. The apparatus of claim 17 wherein said test fixture loops back said at least one test packet through said second interface from a transmit path of said transceiver chip to a receive path of said transceiver chip.

26. The apparatus of claim 17 further comprising an elastic FIFO within a transmit path of said transceiver chip.

27. The apparatus of claim 17 further comprising an elastic FIFO within a receive path of said transceiver chip.

28. The apparatus of claim 17 wherein said transceiver chip comprises a single-chip multiple-sublayer PHY.

29. The apparatus of claim 17, wherein the length of the interpacket gaps is sequentially varied.

30. The apparatus of claim 29, wherein the sequential variance is used to test frequency offset.

31. The apparatus of claim 29, wherein the length of consecutive interpacket gaps varies by 4 bytes.

32. The apparatus of claim 29, wherein the average length of the interpacket gaps is at least 12 bytes.

33. A method for standalone self-testing of a transceiver chip, said method comprising:
generating a first packet stream within said transceiver chip, wherein said first packet stream comprises a plurality of test packets that are separated by interpacket gaps of variable length;
transmitting at least one first test packet over a first test path of said transceiver chip;
receiving said first packet stream at an end of said first test path;
comparing, within said transceiver chip, said received at least one test packet, in the said first packet stream, with at least one first expected packet to test frequency offset;
generating at least one second test packet;
transmitting said at least one second test packet over a second test path of said transceiver chip;
receiving said at least one second test packet at an end of said second test path; and
comparing, within said transceiver chip, said received at least one second test packet with at least one second expected packet.

34. The method of claim 33 wherein said transmitting comprises looping back through a first interface of said transceiver chip and looping back through a second interface of said transceiver chip.

35. The method of claim 33 wherein said transmitting said at least one first test packet includes processing said at least one first test packet through a first section of a receive path of said transceiver chip immediately after generating said at least one first test packet.

36. The method of claim 33 wherein said transmitting said at least one first test packet includes processing said at least one first test packet through an entire transmit path of said transceiver chip, wherein said transmit path includes an elastic FIFO.

37. The method of claim 33 wherein said transmitting said at least one second test packet includes processing said at least one second test packet through a first section of a transmit path of said transceiver chip immediately after generating said at least one second test packet.

38. The method of claim 33 wherein said transmitting said at least one second test packet includes processing said at least one second test packet through an entire receive path of said transceiver chip, wherein said receive path includes an elastic FIFO.

39. The method of claim 33 wherein said transceiver chip comprises a single-chip multiple-sublayer PHY.

40. The method of claim 33, wherein the length of the interpacket gaps is sequentially varied.

41. The method of claim 40, wherein the sequential variance is used to test frequency offset.

42. The method of claim 40, wherein the length of consecutive interpacket gaps varies by 4 bytes.

43. The method of claim 40, wherein the average length of the interpacket gaps is at least 12 bytes.

44. The method of claim 34 wherein said first interface comprises a parallel XAUI interface.

45. The method of claim 34 wherein said second interface comprises a 10 Gbps serial PMD interface.

46. The method of claim 34 wherein said looping back through said first interface comprises electrically wrapping around from a receive path of said transceiver chip to a transmit path of said transceiver chip.

47. The method of claim 34 wherein said looping back through said second interface comprises electrically wrapping around from a transmit path of said transceiver chip to a receive path of said transceiver chip.

48. The method of claim 34 wherein said transmitting said at least one first test packet includes processing said at least one first test packet through a second section of a receive path of said transceiver chip immediately after looping back through said second interface.

49. The method of claim 34 wherein said transmitting said at least one second test packet includes processing said at least one second test packet through a second section of a transmit path of said transceiver chip immediately after looping back through said first interface.

* * * * *